(12) United States Patent
Naim et al.

(10) Patent No.: US 9,432,968 B1
(45) Date of Patent: Aug. 30, 2016

(54) METHOD AND SYSTEM FOR MANAGING SIGNALING IN A WIRELESS COMMUNICATION NETWORK

(71) Applicant: Sprint Spectrum L.P., Overland Park, KS (US)

(72) Inventors: Muhammad A. Naim, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/638,600

(22) Filed: Mar. 4, 2015

(51) Int. Cl.
*H04W 24/00* (2009.01)
*H04W 68/02* (2009.01)
*H04W 64/00* (2009.01)
*H04W 4/02* (2009.01)

(52) U.S. Cl.
CPC ............. *H04W 68/02* (2013.01); *H04W 64/00* (2013.01); *H04W 4/021* (2013.01); *H04W 4/025* (2013.01)

(58) Field of Classification Search
CPC ........... H04W 68/00; H04W 68/0005; H04W 68/02; H04W 4/04; H04W 60/04; H04W 68/06; H04W 68/04; H04W 68/08; H04W 68/10; H04W 64/00; H04W 64/003; H04W 64/006; H04W 4/021; H04W 4/025

USPC ............ 455/435.1, 435.2, 456.1, 456.2, 444, 455/422.1, 456.3, 567
See application file for complete search history.

(56) References Cited

U.S. PATENT DOCUMENTS

| | | | |
|---|---|---|---|
| 9,277,528 B1* | 3/2016 | Talley ................. | H04W 68/00 |
| 2009/0098890 A1 | 4/2009 | Vasudevan et al. | |
| 2010/0081459 A1* | 4/2010 | Bosch et al. ................. | 455/458 |
| 2012/0264443 A1* | 10/2012 | Ng et al. ...................... | 455/450 |
| 2015/0195805 A1* | 7/2015 | Schmidt ............... | H04W 24/08 455/456.1 |
| 2015/0208199 A1* | 7/2015 | Li ......................... | H04W 24/08 455/456.1 |

* cited by examiner

*Primary Examiner* — Jean Gelin

(57) ABSTRACT

Disclosed is a method and system for managing signaling in wireless communication network. Base stations in the network will be divided into groups, but each base station's coverage area will be deemed a separate respective tracking area, and, for each group of base stations, an intermediary will manage transmission of registration and paging signaling between a paging controller and the group of base stations. In practice, when a tracking-area update (TAU) arrives from a WCD in coverage of the group of base stations, the intermediary may forward the TAU to the paging controller only if the TAU represents the WCD's movement into coverage of the group of base stations. Further, when a paging message arrives for a WCD, the intermediary may forward the paging message to the appropriate base station in the group.

20 Claims, 5 Drawing Sheets

METHOD AND SYSTEM FOR MANAGING SIGNALING IN A WIRELESS COMMUNICATION NETWORK

BACKGROUND

Unless otherwise indicated herein, the description in this section is not prior art to the claims and is not admitted to be prior art by inclusion in this section.

A typical wireless communication system includes a number of base stations each radiating to define a respective coverage area in which wireless communication devices (WCDs) such as cell phones, tablet computers, tracking devices, embedded wireless modules, and other wirelessly equipped devices, can operate. In turn, each base station may be coupled with network infrastructure that provides connectivity with one or more transport networks, such as the public switched telephone network (PSTN) and/or the Internet for instance. With this arrangement, a WCD within coverage of the system may engage in air interface communication with a base station and may thereby communicate via the base station with various remote network entities or with other WCDs served by the base station.

In practice, physical base station equipment in such a system may be configured to provide multiple coverage areas, differentiated from each other by direction, carrier frequency, or the like. For simplicity in this description, however, each coverage area may be considered to correspond with a respective base station and each base station may be considered to correspond with a respective coverage area. Thus, an arrangement where physical base station equipment provides multiple coverage areas could be considered to effectively include multiple base stations, each providing a respective one of those coverage areas.

Further, a wireless communication system may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1×RTT and 1×EV-DO), Global System for Mobile Communications (GSM), and Wi-Fi, among others. Each protocol may define its own procedures for managing communications with WCDs.

In accordance with the air interface protocol, each coverage area may operate on one or more carrier frequencies or range of carrier frequencies. Further, each coverage area may define a number of channels or specific resources for carrying signals and information between the base station and WCDs. For instance, on the downlink, certain resources may be used to carry a pilot or reference signal that identifies the coverage area and that WCDs may detect and measure as a basis to evaluate coverage, and other resources may be used to carry paging messages and other such control messages from the base station to WCDs. And on the uplink, certain resources may be used to carry registration requests and other control messages from WCDs to the base station. In addition, certain resources on the uplink and downlink may be set aside to carry bearer traffic (e.g., user communications) between the base station and the WCDs.

When a WCD first powers on or enters into coverage of a wireless communication system, the WCD may search for a strongest coverage area and may then register with the system by transmitting a registration message to the base station that provides that coverage area. The WCD may then operate in an idle mode or a connected (or active) mode in that coverage area. In the idle mode, the WCD may periodically monitor transmissions from the base station in search of any paging messages directed to the WCD and, upon detecting such a paging message or at the initiation of the WCD, may transmit a control message to the base station to facilitate transition to the connected mode. In the connected mode, the WCD may then engage in bearer communication, such as voice calls and/or data sessions, on air interface resources assigned by the base station.

Further, in both the idle mode and connected mode, the WCD may regularly monitor the strength of its serving coverage area and the strength of any other available coverage areas, to help ensure that the WCD operates in the best available coverage. If the WCD detects that the strength of its serving coverage area is threshold low and the strength of another coverage area is sufficiently high, and/or for other reasons, the WCD may then hand over to operate in the other coverage area. In the connected mode, this handover process would involve signaling between the WCD and the system to facilitate transfer of the WCD's connection to the new coverage area. Whereas, in the idle mode, the handover process may involve the WCD simply transitioning to idle in the new coverage area, beginning to monitor transmissions from the base station in the new coverage area in search of any paging messages directed to the WCD.

In practice, a wireless communication system may include a paging controller, such as a mobile switching center (MSC) or mobility management entity (MME), that manages paging of WCDs. As a WCD may move from coverage area to coverage area, one function of the paging controller is to track where in the wireless communication system the WCD is operating, so that when the paging controller has a paging message to send to the WCD, the paging controller can send the paging message to the appropriate base station(s) for transmission to the WCD. To facilitate this, when a WCD initially registers with the system, the WCD's registration message may pass to the paging controller, and the paging controller may store a record of the base station coverage area currently serving the WCD. Further, as the WCD moves from one coverage area to another in the idle mode, the WCD may re-register with the system by transmitting a new registration message, which may similarly pass to the paging controller, and the paging controller may update its record of which base station coverage area is serving the WCD. When the paging controller then has a page message to send to the WCD, the paging controller may send the paging message to the base station currently serving the WCD for transmission by the base station to the WCD.

Overview

A problem with the above registration and paging process is that every time a WCD moves from one coverage area to another, the paging controller would receive and process a new registration message from the WCD. In an area where WCDs frequently move between coverage areas, this registration process could thus create significant signaling and processing load at the paging controller, which could at some point overload the paging controller or cause other issues.

One solution to this problem is to implement "tracking areas" (or "paging zones"). In such an arrangement, the base station coverage areas in the system are divided into groups each defining a respective tracking area having a respective tracking area ID, and each base station in the system broadcasts its tracking area's ID. Further, the paging controller has a record of the tracking areas, so as to facilitate paging on a per-tracking-area basis. When a WCD first powers on or enters into coverage of the system and detects a strongest coverage area, the WCD notes the tracking area ID of that coverage area and registers by sending an initial "tracking-area update" (TAU) message, and the paging controller makes a record of the WCD's serving coverage area and tracking area. In turn, each time the WCD moves to a new coverage area, the WCD then determines if the tracking area ID of the new coverage area is the same as or different than the WCD's current tracking area ID, and the WCD re-registers with the system, by sending a new TAU, only if the tracking area ID is different—so as to notify the paging controller of the WCD's new serving coverage area and new tracking area.

With this tracking area arrangement, when the paging controller then has a paging message to send to a WCD, the paging controller may first attempt to page the WCD in the WCD's coverage area of last registration. Further, absent a response from the WCD to that paging message, or alternatively, the paging controller may page the WCD in all of the coverage areas of the WCD's tracking area, on grounds that the WCD may have moved to one of the other coverage areas of the tracking area but has not yet re-registered in a new tracking area.

Unfortunately, however, this tracking area arrangement can give rise to yet another problem, in that the act of paging a WCD in all coverage areas of a tracking area may include not only paging the WCD in the coverage area where the WCD is operating but also paging the WCD in possibly many other coverage areas where the WCD is not operating, thus unnecessarily burdening the downlink in those other coverage areas.

One solution to this additional problem would be to designate each coverage area in the system as a separate tracking area, so that paging would then occur only in the coverage area where the WCD is operating. However, that solution would in turn give rise to the same problem noted above, in that WCDs would re-register with the paging controller every time they move to new coverage areas, thereby burdening the paging controller with excessive registration signaling. Consequently, a further improvement is desired.

Disclosed herein is a method and system for managing signaling in wireless communication network, to help avoid or minimize issues such as those noted above. In accordance with the disclosure, base stations in the network will be divided into groups, but each base station will be deemed a separate respective tracking area, and, for each group of base stations, an intermediary will manage transmission of registration and paging signaling between the paging controller and the group of base stations. In practice, the intermediary could be provided as a gatekeeper through which signaling between the base stations and the paging controller will pass, so that the intermediary can manage such signaling.

With such an arrangement, each time the WCD sends a TAU upon entry into the coverage of any base station of the group, the intermediary can intelligently manage whether to forward that TAU to the paging controller. If the intermediary determines that the TAU represents the WCD's movement into coverage of the group of base stations (rather than the WCD's movement from coverage of one base station of the group to coverage of another base station of the group), then the intermediary may make a record which base station of the group is serving the WCD and may forward the TAU to the paging controller, and the paging controller may record the TAU accordingly. Whereas, if the intermediary determines that the TAU represents the WCD's movement from coverage of one base station of the group to coverage of another base station of the group (rather than the WCD's movement into coverage of the group of base stations), then the intermediary may forgo forwarding the TAU to the paging controller but may still make a record of which base station of the group is now serving the WCD.

Further, with this arrangement, when the paging controller has a paging message to send to the WCD, the paging controller would send the paging message to the sole base station indicated by the WCD's latest TAU, and the intermediary can intelligently manage where to send that paging message. In particular, the intermediary may consult its records to determine which base station of the group is currently serving the WCD, and the intermediary may forward the paging message to that base station for transmission to the WCD.

With this arrangement, the system may successfully page the WCD in just the base station coverage area where the WCD is operating without unnecessarily transmitting the paging message in other coverage areas where the WCD is operating. Further, the TAU (registration) signaling to the paging controller may be substantially reduced, as TAUs may pass to the paging controller only when WCDs move between groups of base stations, not when WCDs move within groups of base stations—even though each base station is designated as a separate respective tracking area.

Accordingly, in one respect, disclosed herein is a method of managing signaling in a wireless communication network, where the network includes a group of base stations each providing respective coverage in which to serve WCDs, where each base station's coverage defining a separate respective tracking area, and where the network includes a paging controller. In accordance with the method, an intermediary between the group of base stations and the paging controller receives a TAU transmitted from a WCD upon the WCD entering into coverage of one of the base stations, and the intermediary records the TAU (i.e., an indication of which base station is now serving the WCD). Further, in response to receiving the TAU, the intermediary determines whether the TAU results from movement of the WCD into coverage of the group of base stations or rather results from movement of the WCD between coverage of the base stations of the group. And if the determination is that the TAU results from movement of the WCD into coverage of the group of base stations, then the intermediary forwards the TAU to the paging controller; but if the determination is that the TAU results from movement of the WCD between coverage of the base stations of the group, then the intermediary does not forward the TAU to the paging controller.

In another respect, disclosed is a method for managing signaling in a wireless communication network, where the network includes multiple groups of base stations, where each base station provides respective coverage in which to serve WCDs and each base station's coverage defines a separate respective tracking area, and where the network includes a paging controller. In accordance with the method, for each group of base stations, a respective intermediary manages signaling between the group of base stations and the paging controller. Further, that managing of signaling involves (i) receiving a TAU transmitted from a WCD upon the WCD entering into coverage of one of the base stations of the group, (ii) recording the TAU, (iii) responsive to receiving the TAU, making a determination of whether the TAU results from movement of the WCD into coverage of the group of base stations or rather results from movement of the WCD between coverage of the base stations of the group, and (iv) forwarding the TAU to the paging controller only if the determination is that the TAU results from movement of the WCD into coverage of the group of base stations.

Still further, in yet another respect, disclosed is an intermediary for managing signaling in a wireless communication network, where the network includes a group of base stations each providing respective coverage in which to serve WCDs, where each base station's coverage defines a separate respective tracking area, and where the network includes a paging controller. In an example arrangement, the intermediary includes a network communication interface, a processing unit, data storage, and program instructions stored in the data storage and executable by the processing unit (i) to receive via the network communication interface a TAU transmitted from a WCD upon the WCD entering into coverage of one of the base stations, (ii) to record the TAU, (iii) responsive to receiving the TAU, to make a determination of whether the TAU results from movement of the WCD into coverage of the group of base stations or rather results from movement of the WCD between coverage of the base stations of the group, and (iv) to forward the TAU via the network communication interface to the paging controller only if the determination is that the TAU results from movement of the WCD into coverage of the group of base stations.

In addition, features of the disclosure could be provided by a non-transitory computer-readable medium, such as a magnetic, optical, or flash storage mechanism, having encoded thereon instructions executable by a processing unit to cause the processing unit to carry out operations such as those noted above.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
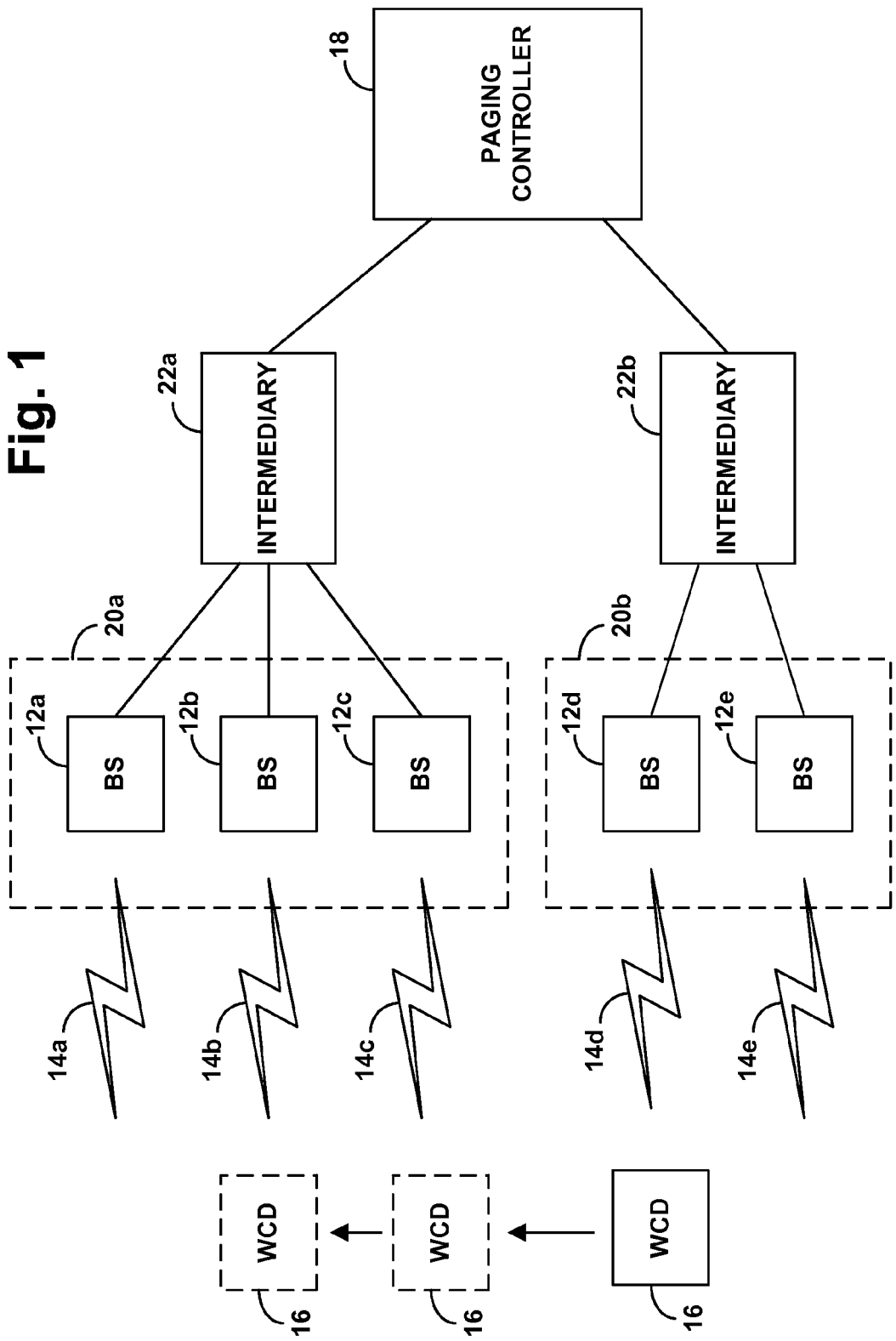
FIG. 1 is a simplified block diagram of an example network in which embodiments of the present method and system can be implemented.

Referring to the drawings, as noted above, FIG. 1 is a simplified block diagram of an example network in which embodiments of the present method and system can be implemented. It should be understood, however, that the arrangement shown and described here and other arrangements and processes described in this document can take other forms. For instance, elements can be added, removed, combined, distributed, re-ordered, re-positioned, or otherwise changed. Further, features described herein as being carried out by one or more entities could be implemented by a programmed processing unit or by various other configurations, as those of ordinary skill in the art would understand.

The example network includes a plurality of base stations, five of which are shown in FIG. 1 as base stations 12a-12e, though other quantities are possible as well. These base stations could take any of a variety of forms, compliant with any of a variety of air interface protocols such as those noted above or others now known or later developed. Depending on the air interface protocol and other factors, the base stations could also be referred to by other names, such as evolved-Node-B's (eNodeBs), access nodes (ANs), access points (APs), base transceiver stations (BTSs), or the like. Further, the base stations could include macro base stations of the type typically implemented by cellular wireless service providers to cover broad areas, and/or small cell base stations (e.g., femtocells, picocells, etc.) of the type typically used to cover smaller areas such as areas in homes, offices, or dense urban areas. As such, each base station would typically include an antenna structure, a transceiver, a radio that is compliant with a particular air interface protocol, and other components to facilitate general base station operation and any special operation described herein.

As shown, each representative base station radiates to define a respective coverage area. In particular, base station 12a radiates to define coverage area 14a, base station 12b radiates to define coverage area 14b, base station 12c radiates to define coverage area 14c, base station 12d radiates to define coverage area 14d, and base station 12e radiates to define coverage area 14e. As noted above, it is possible that some of these coverage areas could emanate from the same physical base station equipment but could be differentiated from each other in various ways, such as by pointing in different directions or operating on different carrier frequencies for instance. For sake of discussion as noted above, the present disclosure will treat each coverage area as corresponding with a respective base station, and vice versa, though other arrangements are possible as well.

Shown in coverage of base station 12d and moving progressively into coverage of base station 12c and then base station 12b is a representative WCD 16, which could be any type of WCD such as those noted above for instance. The progressive movement of the WCD between the coverage of these base stations could result from physical movement of the WCD from one coverage area to another and/or from changes in radio frequency (RF) conditions in particular coverage areas, leading to changes in signal strength or other factors that trigger WCD transition from one coverage area to another. For sake of discussion, we can assume that the WCD operates in an idle mode.

In line with the discussion above, each of the base stations in this arrangement will have a separate respective tracking area ID, which the base station will broadcast in an overhead message to enable WCDs such as WCD 16 to detect entry into a new tracking area so as to trigger tracking area updates. To facilitate this, each base station may be programmed by engineering input with its respective tracking area ID and with program logic that causes the base station to broadcast the tracking area ID in its coverage area. With such an arrangement, when WCD 16 moves into coverage area 14c, the WCD would detect that the tracking area ID coming from base station 12c is different than the one that was coming from base station 12d and would therefore transmit a TAU to base station 12c. Likewise, when the WCD moves from coverage area 14c to coverage area 14b, the WCD would detect that the tracking area ID coming from base station 12b is different than the one that was coming from base station 12c and would therefore transmit a TAU to base station 12b.

As further shown, the example network includes a paging controller 18, such as an MSC or MME, which functions to control paging as discussed above. The paging controller may comprise a computer or other such automated platform having network communication with various other entities and having a processing unit programmed to carry out various functions as described herein. Further, the paging controller could be integrated with other components. In practice, the paging controller may be programmed by engineering input with data that correlates the various base stations with their respective tracking area IDs. For instance, the paging controller may store a table of data that lists tracking area IDs and that maps each tracking area ID to the base station(s) that are in the tracking area, but per the present arrangement, there could be a one-to-one relationship between tracking area ID and base station for the illustrated base stations.

For each WCD operating in coverage of any of the illustrated base stations, the paging controller may also store a record of the tracking area in which the WCD is operating and thus, with the present disclosure, of the base station in whose coverage the WCD is operating. Per the present disclosure, this record may be correct in some instances, but may be incorrect in other instances due to the intermediary operation of only allowing certain TAUs through to the paging controller.

Without the intermediary arrangement of the present disclosure, each TAU that the WCD transmits to a base station upon movement into a new coverage area defining a new tracking area would flow freely from the base station to the paging controller, and the paging controller would update a record for the WCD to indicate that the WCD is now operating in that new tracking area. However, the intermediary arrangement of the present disclosure helps to manage control signaling, to avoid excessive TAU signaling to the paging controller while avoiding overbroad paging.

In the example arrangement shown, the base stations in the network are grouped into two mutually exclusive groups 20a, 20b. Group 20a includes base stations 12a-12c, and group 20b includes base stations 12d-12e. Other groupings are possible as well, with the same or different numbers of base stations per group. Further, for each group of base station, the network includes a respective intermediary. In particular, for group 20a, the network includes intermediary 22a, and for group 20b, the network includes intermediary 22b. In practice, these intermediaries may each comprise a computer or other such automated platform having network communication with various other entities and having a processing unit programmed to carry out various functions as described herein.

Optimally, the groups of base stations could be based on their geographic proximity to each other, and the intermediary for that group could be implemented nearby the base stations or elsewhere. Although intermediaries 22a, 22b are shown as separate blocks in the figure, it is also possible multiple intermediaries such as these (each for a respective different group of base stations) could be provided by the same physical computer equipment, with separate program threads or modules operating per group of base stations or otherwise managing control signaling separately per group of base stations. Moreover, in another arrangement, the intermediary for a given group of base stations could be integrated with a base station of the group, such as with a processing unit of the base station being programmed to function as the intermediary. Other arrangements are possible as well.

Each intermediary in the example arrangement is positioned and configured to function as a signaling gatekeeper through which control signaling that would normally flow between the paging controller and the base stations may pass. To facilitate this, routers and other equipment in the network can be programmed by engineering input with routing rules that cause such control signaling to be routed to the intermediary for the respective group of base stations. (In the event the intermediary is integrated with a base station of the group, similar routing rules could be set in the base stations of the group and in routers or other equipment to facilitate routing of such control signaling through the base station having the intermediary function.) Such rules could be specific to TAUs and paging messages or could be more generally applicable, keyed to the network addresses of the paging controller and base stations at issue. With the intermediary for a group of base stations thereby positioned as a signaling gatekeeper, the intermediary can carry out features of the present disclosure, such as controlling which TAUs pass to the paging controller and directing paging messages to the appropriate base stations.

In practice, the intermediary for a given group of base stations may store data that indicates, respectively for each WCD served by any base station of the group (e.g., idling in coverage of any base station of the group), the base station that is currently serving that WCD. The intermediary can keep this data updated based on TAUs transmitted by the WCD. For instance, when WCD 16 moves into coverage of base station 12c and responsively transmits a TAU to base station 12c, that TAU will flow to intermediary 22a (purportedly on its way to paging controller 18), and intermediary 22a may record the TAU by recording the fact that the WCD is currently served by base station 12c. Likewise, when WCD 16 moves into coverage of base station 12b and responsively transmits a TAU to base station 12b, that TAU will flow to intermediary 22a (purportedly on its way to paging controller 18), and intermediary 22a may record the TAU by recording the fact that the WCD is currently served by base station 12b.

Further, the intermediary for a given group of base stations may intelligently manage whether or not to forward TAUs to the paging controller. In particular, when the intermediary receives a TAU from a WCD, the intermediary may determine whether the TAU is a result of the WCD moving into coverage of the group of base stations as a whole or is rather a result of the WCD moving between coverage of the base stations of the group. If the intermediary does not currently have a record that the WCD is served by a base station of the group, then the conclusion may be that the WCD has just moved into coverage of the group. Whereas, if the intermediary already has a record that the WCD is served by a base station of the group, then the conclusion may be that the WCD has just moved between coverage of the base stations of the group.

In line with the discussion above, the intermediary may then forward the WCD's TAU to the paging controller only if (i.e., conditional upon) the determination being that the TAU is a result of the WCD moving into coverage of the base stations of the group, rather than that the TAU is a result of the WCD moving between coverage of base stations of the group. This way, the paging controller may receive the WCD's TAU only when the WCD moves into coverage of the group of base stations, not when the WCD moves between coverage of base stations of the group. However, when the WCD has moved between coverage of base stations of the group, the intermediary would have a record of which base station is currently serving the WCD, so as to facilitate managing paging message transmission to the WCD.

In turn, when the paging controller has a paging message to send to a WCD (e.g., to alert the WCD to an incoming call or other communication or for other purposes), the paging controller may then transmit the paging message to the base station(s) corresponding with the WCD's current tracking area, which, with the present arrangement, would be a single base station. As discussed above, that paging message would thus be routed to the intermediary for the base station's group, which will enable the intermediary to act upon the paging message.

When the intermediary receives such a paging message for a particular WCD, the intermediary may then consult its records to determine which base station of the group is currently serving the WCD. The base station could be the one to which the paging controller directed the paging message, if the WCD has not moved from that base station's coverage area. But the base station could be a different base station of the group, if the WCD has moved between coverage of base stations of the group. The intermediary may then forward the paging message to the determined base station of the group, and that base station may then transmit the paging message on its air interface for receipt by the WCD.

In practice with this process, the base stations and paging controller need not be aware of the presence of the intermediary (except perhaps for indications by any necessary routing rules). When the intermediary forwards a TAU from a given base station to the paging controller, the intermediary may pass the TAU along in its original form, as a router would. Further, when the intermediary receives from the paging controller a paging message destined to a base station that the paging controller believes is currently serving the WCD, (i) the intermediary can pass that paging message along in its current form if that base station is in fact currently serving the WCD or (ii) the intermediary can change the paging message to be directed to another base station in the group that is the one currently serving the WCD and can pass the page message along to that other base station.

Alternatively, the intermediary in each group could be provisioned in the network and particularly in the paging controller as being a "base station" (having a respective base station ID and a network address of the intermediary, but functioning as a virtual base station), perhaps associated with a respective "tracking area," and the paging controller may be provisioned with corresponding data indicating that "base station" and "tracking area." Each time the intermediary receives and forwards a TAU from a WCD, the intermediary may modify the TAU to appear to come from the "base station" that is the intermediary, and the paging controller may make a record that the WCD is being served by that "base station" in that "tracking area." In turn, when the paging controller has a paging message to send to the WCD, the paging controller may send the paging message to the WCD's serving "base station"—which would actually be the intermediary. And the intermediary may then operate as noted above to pass the paging message along to the appropriate, actual serving base station.

In addition, each intermediary in this arrangement may be set to maintain each of its TAU records for a specific period of time, such as for one hour, and to clear a TAU record after that time expires. Further, when an intermediary determines that a WCD first moves into coverage of the intermediary's group of base stations, the intermediary may also signal via a network connection to each of one or more other intermediaries (such as to an intermediary managing signaling for an adjacent group of base stations) to direct the other intermediary to clear any TAU record that the other intermediary has for the WCD at issue. If the other intermediary has such a record, it may then responsively clear that record.

One additional issue that may arise with the arrangement disclosed herein is that there could be substantial uplink air interface signaling as WCDs transmit TAUs each time they move into new base station coverage. One possible solution to this problem is to have WCDs transmit their TAUs through small cell base stations in the vicinity, using an arrangement similar to that discussed in U.S. patent application Ser. No. 14/258,801, filed on Apr. 22, 2014, the entirety of which is incorporated herein by reference.

Figure 2:
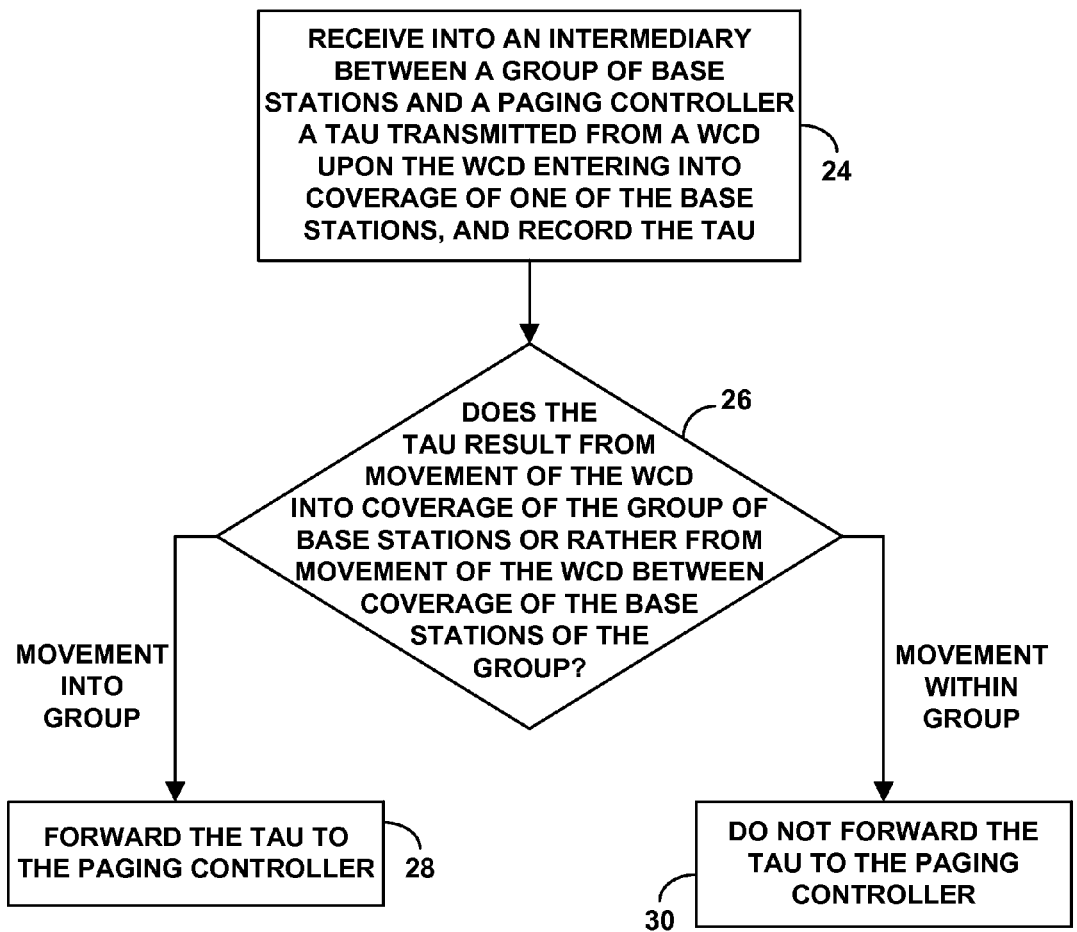
FIG. 2 is a flow chart depicting features of an example method.

FIG. 2 is next a flow chart depicting an example method to manage signaling in a wireless communication network such as that described above, where the network includes a group of base stations each providing respective coverage in which to serve WCDs, where each base station's coverage defines a separate respective tracking area, and where the network includes a paging controller. As shown in FIG. 2, at block 24, the method includes receiving into an intermediary between the group of base stations and the paging controller a TAU transmitted from a WCD upon the WCD entering into coverage of one of the base stations, and recording by the intermediary the TAU. Further, at block 26, the method includes, responsive to receiving the TAU, the intermediary making a determination of whether the TAU results from movement of the WCD into coverage of the group of base stations or rather results from movement of the WCD between coverage of the base stations of the group. In turn, if the determination is that the TAU results from movement of the WCD into coverage of the group of base stations, then, at block 28, the method involves the intermediary forwarding the TAU to the paging controller. But if the determination is instead that the TAU results from movement of the WCD between coverage of the base stations of the group, then, at block 30, the method involves the intermediary not forwarding the TAU to the paging controller (and thus dropping or discarding the TAU).

Figure 3:
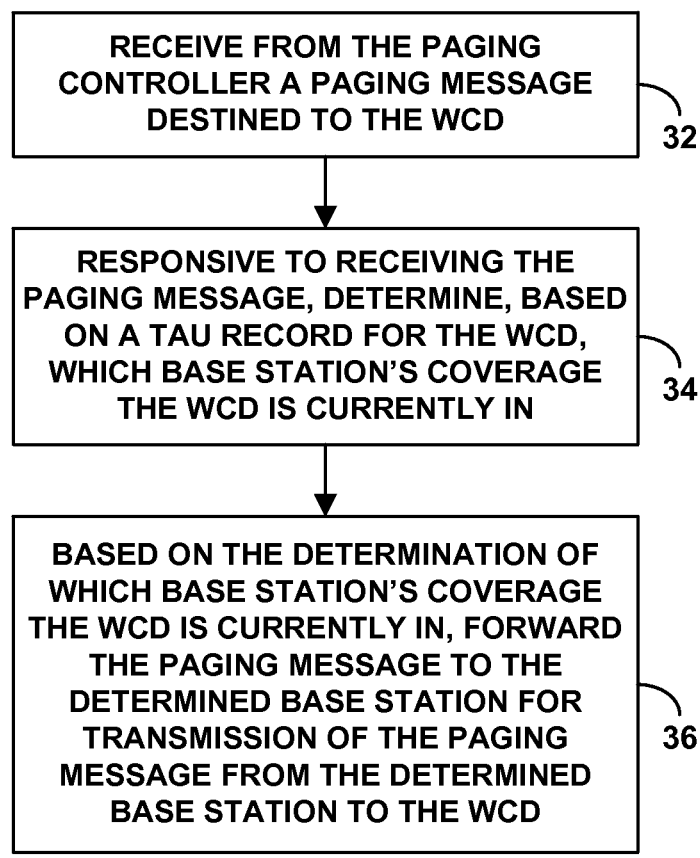
FIG. 3 is a flow chart depicting additional features of the example method.

In addition, FIG. 3 is another flow chart depicting further operations that could be involved in such a method. As shown in FIG. 3, at block 32, the method includes receiving by the intermediary from the paging controller a paging message destined to the WCD. And at block 34 the method includes, responsive to receiving the paging message, the intermediary determining, based on a TAU record for the WCD, which base station's coverage the WCD is currently in. At block 36, the method then includes, based on the determination of which base station's coverage the WCD is currently in, the intermediary forwarding the paging message to the determined base station for transmission of the paging message from the determined base station to the WCD.

In practice, the act of the intermediary receiving the paging message may involve the intermediary receiving packet data that carries the paging message, such as an Internet Protocol (IP) packet carrying the paging message. Such packet data may be transmitted from a source address of the paging controller to a destination address of a base station in the group, and the packet data may arrive at the intermediary as the packet data is en route from the source address to the destination address. The intermediary may then programmatically read the packet data to determine that the packet carries the paging message (e.g., based on a type-of-message value or other data in the packet), so that the intermediary can then act on the paging message as described above.

Likewise, the act of the intermediary receiving the TAU may involve the intermediary receiving packet data that carries the TAU. Such packet data may be transmitted from a source address of a base station in the group to a destination address of the paging controller, and the packet data may arrive at the intermediary as the packet data is en route from the source address to the destination address. The intermediary may then read the packet data to determine that the packet data carries the TAU (e.g., based on a type-of-message value or other data in the packet), so that the intermediary can act on the TAU as described above.

In practice, for instance, the various network nodes shown in FIG. 1 may be nodes on a wireless service provider's core packet-switched network, and so these messages may flow between the nodes, via various routers and the like, through that network. In one example implementation, for instance, the network may be an OFDMA network, the base stations may be OFDMA (e.g., LTE) eNodeBs, and the paging controller may be an MME. Further, in this or other implementations as noted above, the intermediary could operate as a virtual base station that sends TAUs to the paging controller and that receives paging messages from the paging controller.

Figure 4:
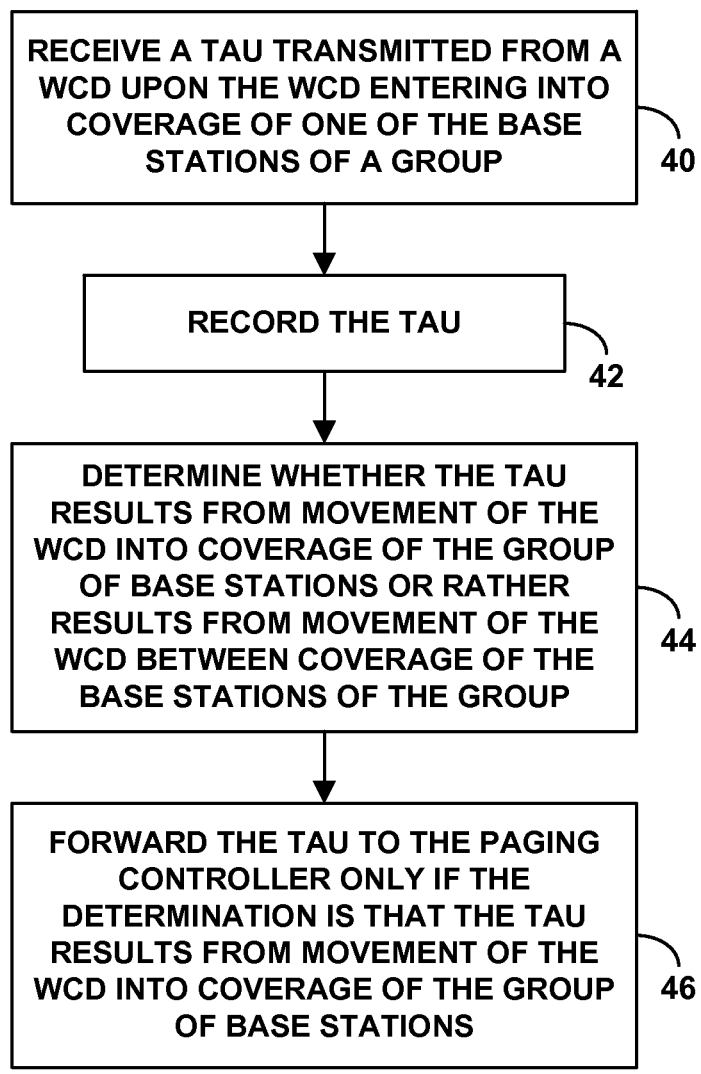
FIG. 4 is a flow chart depicting features of another example method.

FIG. 4 is next an additional flow chart depicting operations that can be involved in managing signaling in a wireless communication network, where the network includes multiple groups of base stations, where each base station provides respective coverage in which to serve WCDs and each base station's coverage defines a separate respective tracking area, and where the network includes a paging controller. In practice, the method here may involve, for each group of base stations, a respective intermediary managing signaling between the group of base stations and the paging controller, which may further involve various features discussed above.

As illustrated in FIG. 4, at block 40, each such intermediary may receive a TAU transmitted from a WCD upon the WCD entering into coverage of one of the base stations of the group. Further, at block 42, the intermediary may record the TAU. And at block 44 (perhaps concurrently with the operation of block 42), in response to responsive to receiving the TAU, the intermediary may make a determination of whether the TAU results from movement of the WCD into coverage of the group of base stations or rather results from movement of the WCD between coverage of the base stations of the group. And at block 46, the intermediary may then forward the TAU to the paging controller only if the determination is that the TAU results from movement of the WCD into coverage of the group of base stations. Further, this method may also involve each intermediary carrying out functions like those depicted in FIG. 3 and discussed above.

Figure 5:
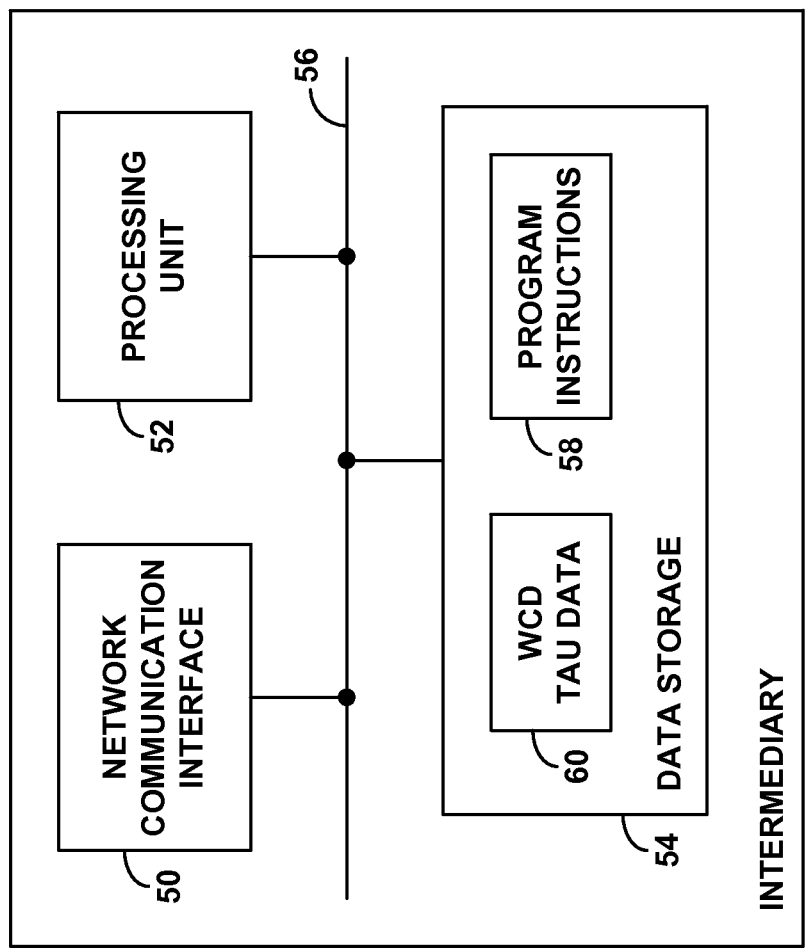
FIG. 5 is a simplified block diagram of an example intermediary operable in accordance with the disclosure.

Finally, FIG. 5 is a simplified block diagram of an example intermediary, showing some of the components that such an intermediary may have to facilitate operations such as those described above. As shown in FIG. 5, the example intermediary includes a network communication interface 50, a processing unit 52, and data storage 54, all of which may be integrated together in various ways or communicatively linked together by a system bus, network, or other connection mechanism 56.

Network communication interface 50 may comprise a wired or wireless Ethernet connection interface or other module that enables the intermediary to communicate with other network nodes such as those discussed above. Processing unit 52 may then comprise one or more general purpose processors (e.g., microprocessors) and/or one or more special purpose processors (e.g., digital signal processors, application specific integrated circuits, etc.) And data storage 54 may comprise one or more volatile and/or non-volatile storage components, particularly non-transitory storage, such as magnetic, optical, or flash storage.

As shown, data storage 54 may then store program instructions (e.g., machine language instructions or other types of instructions) 58 executable by processing unit 52 to carry out various operations described herein. For instance, the program instructions may be executable (i) to receive via the network communication interface a TAU transmitted from a WCD upon the WCD entering into coverage of one of the base stations, (ii) to record the TAU, (iii) responsive to receiving the TAU, to make a determination of whether the TAU results from movement of the WCD into coverage of the group of base stations or rather results from movement of the WCD between coverage of the base stations of the group, and (iv) to forward the TAU via the network communication interface to the paging controller only if the determination is that the TAU results from movement of the WCD into coverage of the group of base stations.

Further, the program instructions may be executable (a) to receive from the paging controller a paging message destined to the WCD, (b) responsive to receiving the paging message, to determine, based on a TAU record for the WCD, which base station's coverage the WCD is currently in, and (c) based on the determining, to forward the paging message to the determined base station for transmission of the paging message from the determined base station to the WCD. Still further, various other features described above could be applied in this context as well.

As additionally shown, the data storage of the intermediary may thus also hold WCD TAU data 60, such as data indicating per WCD which base station of the intermediary's group of base stations is currently serving the WCD, to facilitate the operations discussed herein.

Exemplary embodiments have been described above. Those skilled in the art will understand, however, that changes and modifications may be made to these embodiments without departing from the true scope and spirit of the invention.

We claim:

1. A method of managing signaling in a wireless communication network, wherein the network includes a group of base stations each providing respective coverage in which to serve wireless communication devices (WCDs), wherein each base station's coverage defines a separate respective tracking area, and wherein the network includes a paging controller, the method comprising:

receiving into an intermediary between the group of base stations and the paging controller a tracking-area update (TAU) transmitted from a WCD upon the WCD entering into coverage of one of the base stations, and recording by the intermediary the TAU;

responsive to receiving the TAU, the intermediary making a determination of whether the TAU results from movement of the WCD into coverage of the group of base stations or rather results from movement of the WCD between coverage of the base stations of the group;

if the determination is that the TAU results from movement of the WCD into coverage of the group of base stations, then the intermediary forwarding the TAU to the paging controller; and if the determination is that the TAU results from movement of the WCD between coverage of the base stations of the group, then the intermediary not forwarding the TAU to the paging controller.

2. The method of claim 1, further comprising:
receiving by the intermediary from the paging controller a paging message destined to the WCD;
responsive to receiving the paging message, the intermediary determining, based on a TAU record for the WCD, which base station's coverage the WCD is currently in; and
based on the determining, the intermediary forwarding the paging message to the determined base station for transmission of the paging message from the determined base station to the WCD.

3. The method of claim 2, wherein receiving by the intermediary the paging message comprises receiving by the intermediary packet data carrying the paging message, the method further comprising:
reading by the intermediary the packet data to determine that the packet data carries the paging message.

4. The method of claim 3, wherein the packet data is transmitted from a source address of the paging controller to a destination address of a base station in the group, and wherein the packet data arrives at the intermediary as the packet data is en route from the source address to the destination address.

5. The method of claim 1, wherein the wireless communication network includes more base stations than the base stations of the group, wherein the intermediary operates in connection with the group of base stations, and wherein another such intermediary operates in connection with another group of base stations.

6. The method of claim 1, wherein receiving by the intermediary the TAU comprises receiving by the intermediary packet data carrying the TAU, the method further comprising:
reading by the intermediary the packet data to determine that the packet data carries the TAU.

7. The method of claim 6, wherein the packet data is transmitted from a source address of a base station in the group to a destination address of the paging controller, and wherein the packet data arrives at the intermediary as the packet data is en route from the source address to the destination address.

8. The method of claim 1, wherein the base stations are Orthogonal Frequency Division Multiple Access (OFDMA) evolved Node Bs (eNodeBs), wherein the paging controller is a Mobility Management Entity (MME), and wherein the eNodeBs, the MME, and the intermediary are nodes on a core packet-switched network.

9. The method of claim 1, wherein the intermediary operates as a virtual base station that sends TAUs to the paging controller and that receives paging messages from the paging controller.

10. A method for managing signaling in a wireless communication network, wherein the network includes multiple groups of base stations, wherein each base station provides respective coverage in which to serve WCDs and each base station's coverage defines a separate respective tracking area, and wherein the network includes a paging controller, the method comprising:
for each group of base stations, a respective intermediary managing signaling between the group of base stations and the paging controller,
wherein managing signaling between the group of base stations and the paging controller comprises (i) receiving a tracking-area update (TAU) transmitted from a WCD upon the WCD entering into coverage of one of the base stations of the group, (ii) recording the TAU, (iii) responsive to receiving the TAU, making a determination of whether the TAU results from movement of the WCD into coverage of the group of base stations or rather results from movement of the WCD between coverage of the base stations of the group, and (iv) forwarding the TAU to the paging controller only if the determination is that the TAU results from movement of the WCD into coverage of the group of base stations.

11. The method of claim 10, wherein managing signaling between the group of base stations and the paging controller further comprises (a) receiving from the paging controller a paging message destined to the WCD, (b) responsive to receiving the paging message, determining, based on a TAU record for the WCD, which base station's coverage the WCD is currently in, and (c) based on the determining, forwarding the paging message to the determined base station for transmission of the paging message from the determined base station to the WCD.

12. The method of claim 11, wherein receiving the paging message comprises receiving packet data carrying the paging message and reading the packet data to determine that the packet data carries the paging message.

13. The method of claim 10, wherein receiving the TAU update comprises receiving packet data carrying the TAU and reading the packet data to determine that the packet data carries the TAU.

14. The method of claim 10, wherein the base stations are Orthogonal Frequency Division Multiple Access (OFDMA) evolved Node Bs (eNodeBs), wherein the paging controller is a Mobility Management Entity (MME), and wherein the eNodeBs, the MME, and each intermediary are nodes on a core packet-switched network.

15. The method of claim 10, wherein the intermediary for each group operates as a virtual base station that sends TAUs to the paging controller and that receives paging messages from the paging controller.

16. An intermediary for managing signaling in a wireless communication network, wherein the network includes a group of base stations each providing respective coverage in which to serve wireless communication devices (WCDs), wherein each base station's coverage defines a separate respective tracking area, and wherein the network includes a paging controller, the intermediary comprising:
a network communication interface;
a processing unit;
data storage; and
program instructions stored in the data storage and executable by the processing unit to (i) to receive via the network communication interface a tracking-area update (TAU) transmitted from a WCD upon the WCD entering into coverage of one of the base stations, (ii) to record the TAU, (iii) responsive to receiving the TAU, to make a determination of whether the TAU results from movement of the WCD into coverage of the group of base stations or rather results from movement of the WCD between coverage of the base stations of the group, and (iv) to forward the TAU via the network communication interface to the paging controller only if the determination is that the TAU results from movement of the WCD into coverage of the group of base stations.

17. The intermediary of claim 16, wherein the program instructions are further executable by the processing unit (a) to receive from the paging controller a paging message destined to the WCD, (b) responsive to receiving the paging message, to determine, based on a TAU record for the WCD, which base station's coverage the WCD is currently in, and (c) based on the determining, to forward the paging message to the determined base station for transmission of the paging message from the determined base station to the WCD.

18. The intermediary of claim 17, wherein receiving the paging message comprises receiving packet data carrying the paging message and reading the packet data to determine that the packet data carries the paging message.

19. The intermediary of claim 16, wherein receiving the TAU update comprises receiving packet data carrying the TAU and reading the packet data to determine that the packet data carries the TAU.

20. The intermediary of claim 16, wherein the intermediary is configured to operate as a virtual base station that sends TAUs to the paging controller and that receives paging messages from the paging controller.

* * * * *